(12) United States Patent
Groer et al.

(10) Patent No.: US 7,705,106 B2
(45) Date of Patent: Apr. 27, 2010

(54) INITIAL COMPOUNDS FOR PRODUCING POLYURETHANES

(75) Inventors: Peter Groer, Bad Soden (DE); Regina Hendreich, Frauendorf (DE); Paul Kierkus, Morrisville, NC (US); Thomas Ostrowski, Mannheim (DE); Eckhard Stroefer, Mannheim (DE); Kai Thiele, Schwarzheide (DE); Christoph Schnorpfeil, Dresden (DE); Edward Michael Dexheimer, Grosse Ile, MI (US)

(73) Assignee: BASF Aktiengesellschaft, Ludwigshafen (DE)

( * ) Notice: Subject to any disclaimer, the term of this patent is extended or adjusted under 35 U.S.C. 154(b) by 1218 days.

(21) Appl. No.: 10/554,505

(22) PCT Filed: Apr. 16, 2004

(86) PCT No.: PCT/EP2004/004036

§ 371 (c)(1),
(2), (4) Date: Oct. 26, 2005

(87) PCT Pub. No.: WO2004/096746

PCT Pub. Date: Nov. 11, 2004

(65) Prior Publication Data

US 2006/0205915 A1    Sep. 14, 2006

(30) Foreign Application Priority Data

Apr. 28, 2003   (DE) ................. 103 19 242

(51) Int. Cl.
*C08G 18/00* (2006.01)
(52) U.S. Cl. .............................. 528/65; 528/44; 528/85; 560/25; 560/26; 560/115; 560/158
(58) Field of Classification Search .................. 528/85, 528/230, 270, 44, 65; 568/422; 252/1; 560/25, 560/26, 115, 158
See application file for complete search history.

(56) References Cited

U.S. PATENT DOCUMENTS 3,682,845 A * 8/1972 Longley ...................... 521/177
4,247,654 A    1/1981 Wagner

FOREIGN PATENT DOCUMENTS

| DE | 247 223 | 7/1987 |
| EP | 1 063 221 | 12/2000 |
| SU | 767 122 | 9/1980 |

OTHER PUBLICATIONS http://www.chemvip.com/index/products_index/all_products/all_products_polyols/product-paraformaldehyde.htm.*

* cited by examiner

*Primary Examiner*—Randy Gulakowski
*Assistant Examiner*—Michael Leonard
(74) *Attorney, Agent, or Firm*—Oblon, Spivak, McClelland, Maier & Neustadt, L.L.P.

(57) ABSTRACT

The invention relates to starting compounds which can be used for the preparation of polyurethanes and can be prepared by reaction of hydroxyl-containing oligomers of formaldehyde.

13 Claims, No Drawings

INITIAL COMPOUNDS FOR PRODUCING POLYURETHANES

The present invention relates to novel starting compounds for the preparation of polyurethanes and to a process for preparing them.

Polyurethanes and their preparation have been known for a long time and have been described many times in the literature. They are usually prepared by reacting polyisocyanates with compounds having at least two hydrogen atoms which are reactive toward isocyanate groups.

As compounds having at least two hydrogen atoms which are reactive toward isocyanate groups, use is usually made of polyols. Among these, polyether alcohols and polyester alcohols have the greatest industrial importance.

Polyester alcohols are usually prepared by reacting at least bifunctional alcohols with at least bifunctional carboxylic acids.

The polyether alcohols are generally obtained by addition of alkylene oxides onto OH- or NH-functional starter compounds.

The price of the polyols customary hitherto is determined by the starter compounds used and the alkylene oxides employed, in particular propylene oxide and ethylene oxide.

A significantly cheaper starting compound for preparing polyols would be formaldehyde. It is known that formaldehyde reacts with itself to form oligomers having terminal hydroxyl groups. However, this reaction usually leads to a mixture of oligomers and polymers of varying chain length which are in equilibrium with formaldehyde. Compounds having such a broad molecular weight distribution cannot be used for preparing polyurethanes. A further disadvantage of these compounds is their unsatisfactory stability. Even after a short time, redissociation of the oligomers and polymers occurs.

DD 247 223 describes a process for preparing polyether alcohols in which a mixture of formaldehyde condensates, known as formose, and other compounds having active hydrogen atoms is reacted with alkylene oxides. In this process, too, the formose has a broad molecular weight distribution.

EP 1 063 221 describes a method for preparing formaldehyde oligomers of the formula (I) having a narrow molecular weight distribution from formaldehyde. The reaction proceeds according to the equation

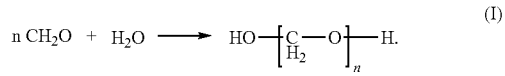

Here, formaldehyde oligomers of the formula (I) in which n=2 to 19, preferably 2-9, can be obtained by dewatering of formaldehyde solutions. These solutions can contain up to 80% of oligoformaldehyde, and free water is not present. It is possible to separate off individual fractions, i.e. oligomers having particular chain lengths, by means of a particular procedure, especially by means of distillation. The oligomers are reacted with other substances, exploiting the defined redissociation of the oligomers to formaldehyde.

The resulting oligomer mixture comprising generally 2-9 formaldehyde units, including polyoxymethylene, is unstable. Within 2 hours, higher molecular weight compounds (paraformaldehyde), water and monomolecular hydrated formaldehyde are formed.

It is an object of the present invention to reduce the costs of the starting materials for the preparation of polyurethanes, in particular the costs of the polyols.

We have found that this object is achieved by using formaldehyde and its oligomers in a simple fashion as starting substance for the preparation of polyurethane raw materials.

The present invention accordingly provides starting compounds for the preparation of polyurethanes, hereinafter also referred to as polyurethane raw materials, which can be prepared by reaction of hydroxyl-containing oligomers of formaldehyde.

The invention further provides a process for preparing polyurethane raw materials by reaction of the hydroxyl groups of oligomers of formaldehyde.

As oligomers of formaldehyde, use is made of mixtures of compounds of the formula (I),

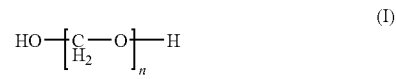

where n is an integer from 2 to 19, in particular from 2 to 9.

The compounds of the formula (I) can be prepared by known methods. Thus, the oligomers can be produced by the known polymerization of trioxane, a cyclic reaction product of formaldehyde. This process is known from the literature. It is preferably employed for preparing polyoxymethylene (POM) and is described, for example, in Römpp Chemie Lexikon. However, this process is not preferred for the preparation of the polyurethane raw materials of the present invention, since high molecular weight reaction products are preferentially formed.

In a preferred embodiment of the invention, the oligomers are prepared by the process described in EP 1 063 221, with the subsequent reaction of the oligomers with aniline described in this document being omitted.

The preparation of the oligomers of formaldehyde is carried out by separating off particular fractions from a solution in which formaldehyde and its oligomers are in equilibrium. This separation is preferably carried out by distillation, usually by means of a film evaporator, in particular by means of a thin film evaporator. Suitable operating conditions for the film evaporator are generally a temperature of from 10 to 230° C., preferably from 10 to 150° C., and an absolute pressure of from 0.5 mbar to 2 bar. Temperatures of from 20 to 100° C. and atmospheric pressure are preferred for the fractionation of an aqueous formaldehyde solution.

The fractions of oligomers of formaldehyde which have been separated off in this way usually have a very narrow molecular weight distribution. They are, as mentioned above, storage-stable for a particular time and should be processed further during this time in order to avoid a change in their composition.

In principle, separation of particular oligomers from the reaction mixture could be omitted and the mixture be used directly for preparing the starting compounds for the preparation of polyurethanes. However, this has the disadvantage that this mixture contains large amounts of free formaldehyde and water, resulting in a high level of secondary reactions.

The above-described oligomers of the formula (I) can in principle also be used without further treatment as starting compounds for the preparation of polyurethanes. If the reaction immediately follows their isolation, degradation reactions which lead to elimination of formaldehyde are avoided.

However, preference is given to carrying out a reaction of the terminal hydroxyl groups of the oligomers.

In the reaction of the oligomers to form starting compounds for the preparation of polyurethanes, their terminal hydroxyl groups are reacted.

In one embodiment of the invention, the terminal hydroxyl groups are reacted with alkylene oxides to form polyether alcohols. The reaction is usually carried out as in the known preparation of polyether alcohols using the customary alcoholic starter substances.

The hydroxyl number of the oligomers is, depending on the number of formaldehyde units, in the range from 1 436 mg KOH/g at n=2 to 389 mg KOH/g at n=9. Since the oligomers are water-free after they have been separated off, a drying step between isolation of the oligomers and their reaction with the alkylene oxides is no longer necessary.

As is customary in industry, the reaction of the oligomers of formaldehyde with the alkylene oxides is carried out in the presence of catalysts. Catalysts which can be used are, as is customary, basic compounds such as amines, basic metal oxides and metal hydroxides, in particular potassium hydroxide.

Preferred catalysts are multimetal cyanide compounds, also referred to as DMC catalysts. Such compounds have been known for a long time and are described, for example, in EP 654 302 or EP 862 947. Advantages of the use of DMC catalysts are firstly that they can remain in the product after the reaction and secondly that, in contrast to basic catalysts, they do not promote redissociation of the oligomers.

As alkylene oxides, it is possible to use the compounds which are known and customary for this purpose. Ethylene oxide and propylene oxide, which can be used individually or in any mixtures with one another, have the greatest industrial importance. When ethylene oxide and propylene oxide are used, the two alkylene oxides can be introduced together to produce a random polyether chain or in succession to form alkylene oxide blocks.

The type and amount of alkylene oxides introduced depends, in particular, on the use to which the polyether alcohols are to be put. For use in rigid foams, the polyether alcohols have short chains. The hydroxyl number of such polyether alcohols is usually in the range from 300 to 600 mg KOH/g, in particular from 400 to 500 mg KOH/g. As alkylene oxide, preference is given to using propylene oxide.

For use in flexible foams, use is usually made of long-chain polyether alcohols. The hydroxyl number of these polyether alcohols is usually in the range from 30 to 120 mg KOH/g, preferably in the range from 30 to 60 mg KOH/g. As alkylene oxides, use is usually made of mixtures of ethylene oxide and propylene oxide. In the case of particular applications, for example for the production of cold-cure molded foams, a pure ethylene oxide block is added on at the end of the polyether chain.

When DMC catalysts are employed for preparing the polyether alcohols, preference is given to using propylene oxide or a random mixture of propylene oxide and ethylene oxide as alkylene oxide. In a preferred embodiment of this process, a random mixture of ethylene oxide and propylene oxide is metered in and the ratio of the two alkylene oxides in the mixture is altered during the metered addition, as described in WO 01/44347.

This process variant makes it possible to prepare diols having a narrow molar mass distribution within wide molar mass ranges in a simple fashion by use of oligomers of different molecular weights.

The oligomers of formaldehyde can be reacted either alone or in admixture with other H-functional starter substances with the alkylene oxides. As additional starter substances, preference is given to using at least bifunctional alcohols such as glycerol, trimethylolpropane, ethylene glycol, propylene glycol or their higher homologues.

The reaction of the starter substance with the alkylene oxides is generally carried out at the pressures customary for this purpose in the range from 0.1 to 1.0 MPa and the customary temperatures in the range from 80 to 140° C. The introduction of the alkylene oxides is usually followed by an after-reaction phase to complete the reaction of the alkylene oxides. In an advantageous embodiment of the process of the present invention, a further catalyst, in particular amine catalyst, is added to the reaction mixture at the beginning of the after-reaction phase, preferably immediately after the introduction of the alkylene oxides has been concluded.

After the addition reaction of the alkylene oxides, the polyether alcohols are usually subjected to a brief treatment by distillation to separate off volatile impurities. If necessary, the polyether alcohol can subsequently be filtered to remove any solid impurities present. If basic compounds are used as catalysts, the catalyst is removed after the addition reaction of the alkylene oxides. This can be achieved by neutralization with acids or by use of adsorbents. The salts or the adsorbents are subsequently removed by filtration.

In a particular embodiment of the process of the present invention, the reaction of the oligomers of formaldehyde with the alkylene oxides, in particular when using DMC catalysts, can also be carried out continuously. In this case, the oligomer mixture which has been separated off and the alkylene oxide and also the catalyst are introduced continuously into a reactor and the polyether alcohol formed is taken off continuously from the reactor. Such continuous processes are described, for example, in DD 203 235 and WO 98/03571. The continuous reaction can be carried out, for example, in tube reactors, stirred vessels or loop reactors. In this variant of the process of the present invention, the continuous preparation of the polyether alcohols by reaction of the oligomers with alkylene oxides can immediately follow the likewise continuous isolation of the oligomers.

The polyether alcohols obtained in this way can be reacted with isocyanates without problems by customary methods to give polyurethanes. Here, the polyether alcohols of the present invention can be used either alone or preferably in admixture with other compounds such as additional alcohols, in particular short-chain polyfunctional alcohols, polyether alcohols and/or polyester alcohols, preferably polyether alcohols. As short-chain alcohols, use is usually made of bifunctional or polyfunctional alcohols having a molecular weight in the range from 62 to 400 g/mol, e.g. ethylene glycol, propylene glycol and their higher homologues or glycerol.

As polyether alcohols and polyester alcohols, it is possible to use the compounds which are known and customary for this application. They usually have a molecular weight $M_n$ of above 400 g/mol, preferably in the range from 400 to 15 000 g/mol. These polyols are prepared by customary and known methods, in the case of the polyester alcohols by reaction of polyfunctional alcohols with polyfunctional carboxylic acids, and in the case of the polyether alcohols by addition of alkylene oxides onto H-functional starter substances. The reaction may, depending on the type of polyurethanes desired, be carried out in the presence of catalysts, blowing agents and customary auxiliaries and/or additives.

In a further embodiment of the present invention, the oligomers of formaldehyde are, after they have been separated off from the reaction mixture, reacted with isocyanates to form prepolymers.

For this purpose, the terminal hydroxyl groups of the oligomers of the formula (I) which have been separated off as described above are reacted with isocyanates. Since the oligomers are storage-stable for only a limited time, the reaction in this case, too, has to be carried out immediately after isolation of the oligomers if a product having a narrow molar mass distribution is to be obtained.

If the oligomers are stored for too long, not only does the molar mass distribution become broader but formation of formaldehyde and water in the oligomer mixture also occurs. Although the formaldehyde formed can in principle be removed by stripping, its formation is disadvantageous for further processing of the oligomers to form prepolymers, since it leads to undesirable secondary reactions.

As a result of the reaction of all hydroxyl groups of the oligomers, redissociation of the oligomers is completely suppressed. The prepolymers are storage-stable and can be processed like prepolymers derived from other polyols customary in polyurethane chemistry.

The reaction of the hydroxyl-containing oligomers with the isocyanates is carried out in the manner customary for preparing prepolymers containing isocyanate groups. The oligomer is for this purpose reacted with at least that amount of isocyanate which suffices for complete reaction of the hydroxyl groups of the oligomer. The reaction can be carried out in the presence of customary urethane formation catalysts. To carry out the reaction, it is usual to place the isocyanate compound, if desired in the presence of a catalyst, in a reaction vessel at from 40 to 100° C., preferably from 50 to 80° C. The oligomer mixture is metered in while stirring, and the reaction mixture is subsequently allowed to react further at from 60 to 140° C., preferably from 80 to 100° C., usually for up to two hours, if appropriate to complete conversion.

The NCO content of the prepolymers is dependent on the molar mass of the oligomers, the excess of isocyanate used, the reaction time, the residence time, the reaction temperature and the catalysts used.

The NCO content of the prepolymers is usually in the range from 10 to 30% by weight, preferably from 15 to 25% by weight.

The oligomers of formaldehyde can be reacted either individually or in admixture with other compounds having at least two hydrogen atoms which are reactive toward isocyanate groups with the isocyanates. The components which can be reacted together with the oligomers of formaldehyde with isocyanates to form prepolymers are, in particular, alcohols. Depending on the intended use of the prepolymers, it is possible to use various alcohols in an amount of from 0 to 90% by weight, preferably from 0 to 60% by weight, in each case based on the sum of the oligomers of formaldehyde and the other compounds having at least two hydrogen atoms which are reactive toward isocyanate groups.

For most applications, the additional alcohols used are short-chain polyfunctional alcohols, polyether alcohols and/or polyester alcohols, preferably polyether alcohols. As short-chain alcohols, it is usual to use bifunctional or polyfunctional alcohols having a molecular weight in the range from 62 to 400 g/mol, e.g. ethylene glycol, propylene glycol and their higher homologues or glycerol.

As polyether alcohols and polyester alcohols, it is possible to use the alcohols which are customary for this application and have been described in more detail above. It is also possible for the polyether alcohols which have been prepared by addition of alkylene oxides onto oligomers of the formula (I) to be reacted together with the oligomers of formaldehyde with isocyanates.

Isocyanates which can be used in the process of the present invention are all isocyanates having two or more isocyanate groups in the molecule. It is possible to use both aliphatic isocyanates such as hexamethylene diisocyanate (HDI) or isophorone diisocyanate (IPDI) or preferably aromatic isocyanates such as tolylene diisocyanate (TDI), diphenylmethane diisocyanate (MDI) or mixtures of diphenylmethane diisocyanate and polymethylenepolyphenylene polyisocyanates (P-MDI), preferably TDI and MDI. It is also possible to use isocyanates which have been modified by incorporation of uretdione, isocyanurate, allophanate, uretonimine and other groups. These compounds are frequently also referred to as modified isocyanates.

The prepolymers which have been prepared in this way can be reacted with compounds having at least one, preferably at least two, hydrogen atom(s) which is/are reactive toward isocyanate groups in the molecule to give polyurethanes. Depending on the type of polyols and isocyanates used, the prepolymers can be processed to produce rigid foams, flexible foams, adhesives, coatings or elastomers.

The invention is illustrated by the following examples.

EXAMPLE 1

A formalin solution having a formaldehyde content of 37% by weight was evaporated to a theoretical formaldehyde content of 73% by weight by means of a thin film evaporator at a wall temperature of 80° C. and 120 mbar. The solution was stored at 80° C. and processed further within one hour. 961 g of this solution were admixed with 38.4 g of dimethylcyclohexylamine in a pilot plant autoclave and 1 010 g of propylene oxide were metered in at 100° C. over a period of 6 hours. The reaction mixture was subsequently allowed to react further at the same temperature for 2 hours. Volatile constituents were then removed under reduced pressure. The liquid reaction product which remained had a hydroxyl number of 685 mg KOH/g and a water content of 0.011% by weight. Analysis by GPC indicated oligomeric products having a molar mass in the range 100-500 g/mol. Examination by means of gas chromatography and mass spectroscopy coupled thereto (GC-MS) showed that adducts of two molecules of propylene oxide and two molecules of formaldehyde had been formed.

EXAMPLE 2

A formalin solution having a formaldehyde content of 37% by weight was evaporated to a theoretical formaldehyde content of 73% by weight by means of a thin film evaporator at a wall temperature of 80° C. and 120 mbar. The solution was stored at 80° C. and processed further within one hour. 1 110 g of this solution were admixed with 70 g of potassium hydroxide in a pilot plant autoclave and 1 600 g of propylene oxide were metered in over a period of 9 hours. The liquid reaction product had a hydroxyl number of 868 mg KOH/g and a water content of 0.014% by weight. Analysis by means of gel permeation chromatography indicated oligomeric products having a molar mass in the range 100-500 g/mol. GC-MS showed that adducts of two molecules of propylene oxide and two molecules of formaldehyde had been formed.

What is claimed is:

1. A polyurethane prepolymer which is prepared by reaction of hydroxyl groups of an oligomer of formaldehyde represented by formula (I)

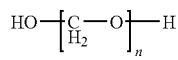 (I)

with an isocyanate,
wherein n is an integer from 2 to 19.

2. The polyurethane prepolymer as claimed in claim 1 wherein an NCO content is in a range from 10 to 30% by weight of the polyurethane prepolymer weight.

3. The polyurethane prepolymer as claimed in claim 1 wherein an NCO content is in a range from 15 to 25% by weight of the polyurethane prepolymer weight.

4. A process for preparing polyurethanes, which comprises reacting compounds as claimed in claim 1 with compounds having at least two groups which are reactive toward isocyanates.

5. The polyurethane prepolymer as claimed in claim 1, wherein the oligomer of formaldehyde represented by formula (I) is obtained by a process comprising distillation of a solution wherein formaldehyde and oligomers of formaldehyde are in equilibrium.

6. The polyurethane prepolymer as claimed in claim 5, wherein the process comprising distillation of a solution wherein formaldehyde and oligomers of formaldehyde are in equilibrium is thin film evaporation.

7. The polyurethane prepolymer as claimed in claim 5, wherein the oligomer of formaldehyde represented by formula (I) is a fraction of oligomers having narrow molecular weight distribution obtained from the distillation of the solution wherein formaldehyde and oligomers of formaldehyde are in equilibrium.

8. The polyurethane prepolymer as claimed in claim 1, wherein
a hydroxyl number of the oligomer of formaldehyde represented by formula (I) is in a range of 1436 mg KOH/g to 389 mg KOH/g.

9. The polyurethane prepolymer as claimed in claim 1, wherein the isocyanate is an isocyanate having two or more isocyanate groups.

10. The polyurethane prepolymer as claimed in claim 9, wherein the isocyanate is an aliphatic isocyanate, an aromatic isocyanate or a modified isocyanate.

11. The polyurethane prepolymer as claimed in claim 10, wherein the isocyanate is an aliphatic isocyanate being hexamethylene diisocyanate or isophorone diisocyanate.

12. The polyurethane prepolymer as claimed in claim 10, wherein the isocyanate is an aromatic isocyanate selected from the group consisting of tolylene diisocyanate, diphenylmethane diisocyanate, and a mixture of diphenylmethane diisocyanate and polymethylenepolyphenylene polyisocyanates.

13. The polyurethane prepolymer as claimed in claim 10, wherein the isocyanate is a modified isocyanate which has been modified by incorporation of one group selected from the groups consisting of a uretdione, an isocyanurate, an allophanate and an uretonimine.

* * * * *